Patented Sept. 3, 1935

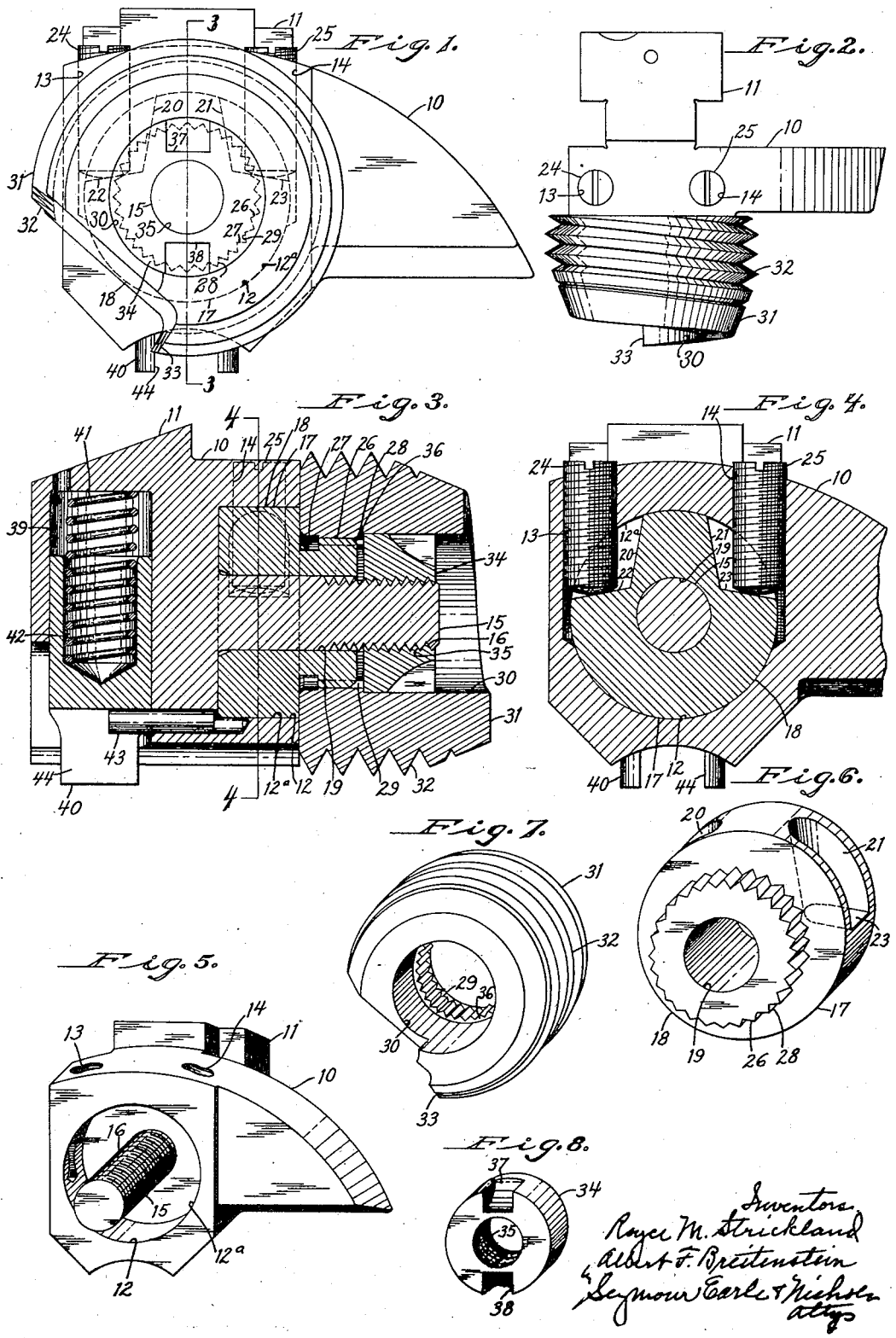

2,013,452

UNITED STATES PATENT OFFICE 2,013,452

ADJUSTABLE CHASER-HOLDING MEANS

Royce M. Strickland and Albert F. Breitenstein, New Haven, Conn., assignors to The Geometric Tool Company, New Haven, Conn., a corporation Application March 15, 1933, Serial No. 660,852

5 Claims. (Cl. 10—103)

This invention relates to improved means for mounting so-called "circular" thread-cutting chasers and the like with capacity for rotary adjustment.

Various means have heretofore been devised for mounting circular chasers with capacity for rotary adjustment so as to permit the proper alignment of their cutting-edges but all such means have been open to various objections among which may be mentioned lack of rigidity, inconvenience of operation, liability to breakage under operating strains, coarseness of adjustment, etc., etc.

One of the objects of the present invention is to provide reliable and effective means for mounting a circular chaser which will permit the convenient rotary adjustment of such a chaser and afford a firm and rigid support therefor despite severe operating strains.

A further object of this invention is to provide convenient and reliable means whereby micrometer rotary adjustment of a circular chaser may be effected over a wide arc of movement.

Other objects will appear to those skilled in the art from the following, taken in conjunction with the accompanying drawing and appended claims.

In the accompanying drawing:

Fig. 1 is a face view of a chaser-carrier showing a circular chaser mounted thereon by means constructed in accordance with the present invention;

Fig. 2 is an edge view thereof on a slightly smaller scale;

Fig. 3 is a sectional view thereof taken on the line 3—3 of Fig. 1;

Fig. 4 is a transverse sectional view taken on the line 4—4 of Fig. 3;

Fig. 5 is a perspective view of the chaser-carrier detached;

Fig. 6 is a similar view of the chaser-adjusting ring;

Fig. 7 is a similar view of the chaser; and

Fig. 8 is a similar view of the clamping-nut.

The particular embodiment herein chosen for the illustration of the present invention includes a plate-like chaser-carrier 10 having an offsetting T-shaped tang 11 providing means whereby the carrier may be mounted in a die-head with capacity for movement therein in the usual manner of adjustable and self-opening die-heads.

In its forward face the chaser-carrier 10 is formed with a forwardly-opening cylindrical recess 12, the cylindrical lateral wall 12ᵃ of which is intersected at substantially diametrically-opposite points by tangentially-arranged threaded screw-receiving bores 13 and 14. Projecting axially from the recess 12 is a stud 15 having screw-threads 16 adjacent its outer end for the purpose as will hereinafter appear. The said stud is preferably, though not necessarily, formed integral with the chaser-carrier 10 in order to afford the utmost strength and rigidity.

Fitting over the stud 15 and entering the cylindrical recess 12 in the chaser-carrier 10 is a chaser-adjusting ring 17 preferably contoured so as to have its cylindrical exterior surface 18 snugly fit the cylindrical wall 12ᵃ of the said recess 12 and its cylindrical bore 19 snugly fit the periphery of the stud 15. On its respective opposite sides the chaser-adjusting ring 17 is provided with notches 20 and 21, the bottom walls of which respectively provide abutments 22 and 23 for engagement by the inner ends respectively of adjusting-screws 24 and 25 mounted in the bores 13 and 14 before referred to.

Offstanding from the forward face of the adjusting-ring 17 is a coupling-stem 26 having its periphery grooved at 27 and also provided with an annular series of serrations 28 adapted to engage a similar series of serrations 29 inwardly offsetting within the axial bore 30 of a circular chaser 31 adjacent the rear end thereof. The said complementary serrations 28 and 29 serve to interlock the chaser 31 to the chaser-adjusting ring 17, while permitting its axial separation therefrom for the purpose of effecting coarse rotary adjustment. The periphery of the chaser 31 is grooved to provide a series of substantially-annular thread-cutting teeth 32 terminating in a cutting-lip 33 which, in accordance with usual practice, is repeatedly ground as it becomes dull, to maintain an efficient cutting-edge.

Fitting within the outer end of the axial bore 30 of the chaser 31 is a cylindrical clamping-nut 34 preferably fitting the said bore snugly and provided with an internally-threaded bore 35 having threaded engagement with the threads 16 at the outer end of the stud 15 and adapted to have its inner face bear against an outwardly-facing annular clamping-shoulder 36 formed within the bore 30 in the chaser 31 for the purpose of firmly seating the said chaser against the forward face of the chaser-carrier 10. At diametrically-opposite points the nut 34 is preferably provided with notches 37 and 38 for the reception of a suitable tool, such as a spanner wrench.

The T-shaped tang 11 of the chaser-carrier 10 before referred to is formed with a cylindrical bore 39 receiving a plunger 40 normally pressed outwardly by a helical spring 41 housed partially within the said bore and housed partially within a pocket 42 formed in the plunger 40. The outward movement of the plunger 40 under the urge of the spring 41, is limited by a stop-pin 43 rigidly mounted in the chaser-carrier and rearwardly projecting therefrom into a notch 44 formed in the outer end of the plunger 40.

In assembling the parts above described, the chaser-adjusting ring 17 is sleeved over the stud 15 and seated within the cylindrical recess 12 in the chaser-carrier 10 and oriented so that its complementary notches 20 and 21 align with the complementary screw-receiving bores 13 and 14. The screws 24 and 25 may now be introduced into the said bores 13 and 14. When the chaser-adjusting ring 17 is seated in the recess 12 as described, its coupling-stem 26 projects beyond the front face of the chaser-carrier 10 so that the chaser 31 may first be roughly oriented and then slid axially over the stud 15 and over the said coupling-stem 26 to bring its rear face to a bearing against the forward face of the chaser-carrier 10. In the position just described the serrations 29 of the said chaser will be engaged with the serrations 28 of the chaser-adjusting ring 17 so as to be firmly interlocked therewith against relative rotary movement.

The clamping-nut 34 may now be entered into the outer end of the axial bore 30 of the chaser 31 and threaded onto the outer end of the stud 15 until its inner edge engages with the clamping-shoulder 36 in the said bore 30, with the effect of firmly seating the rear face of the said chaser against the respective forward faces of both the chaser-carrier 10 and the chaser-adjusting member 17 proper. The chaser 31 may now have its rotary position minutely adjusted by suitably manipulating one or both of the adjusting-screws 24 and 25 to bring the cutting-lip 33 of the said chaser into the desired position. After the desired adjustment has been made, both of the screws 24 and 25 are bound down tightly and will thus act to firmly hold the chaser-adjusting ring 17 against rotation with respect to the carrier-member 10 and hence similarly hold the chaser 31 itself.

Should the cutting-lip become dull, the chaser may be removed by first removing the clamping-nut 34 and may be then reinstalled and again oriented as above described.

After a grinding operation, if the movement required to properly align the cutting-lip is more than may be conveniently accomplished by turning the chaser-adjusting ring 17 itself, the chaser may be axially separated from the stem 26 of the chaser-adjusting ring and turned with respect thereto a distance corresponding to one serration or more and the micrometer adjustment subsequently accomplished by means of the screws 24 and 25. Thus, the orientation of the chaser with respect to the chaser-adjusting ring affords a rough adjustment, which may be subsequently modified in one direction or the other by bodily turning the said chaser-adjusting member by means of the screws 24 and 25 or other suitable adjusting means.

By means of the present invention an extremely rigid support is provided for the chaser without sacrificing either ease or convenience of adjustment.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

In the particular structure shown, the strains when in use, tend to turn the chaser in a counter-clockwise direction with respect to the stud 15 and for this reason, the interengaging threads on both the nut 34 and the said stud are preferably left-hand so that such slight yield as the chaser may have will tend to tighten rather than loosen the said nut.

We claim:

1. In combination, a carrier-member having a cylindrical recess therein; a ring-like chaser-adjusting member having an axial passage and rotatably mounted in the said recess of the said carrier-member; a chaser having an axial passage and engaged with the said chaser-adjusting member; interengaging means for interlocking the said chaser to the said chaser-adjusting member against rotation with respect thereto; adjusting means associated with the said carrier-member and operable to turn the said chaser-adjusting member and hence the said chaser which is connected thereto; a stud rigid with and extending outwardly from the said carrier-member through the respective axial passages in the said chaser-adjusting member and the said chaser; and a cylindrical clamping-nut threaded onto the outer end of the said stud and fitting within the axial passage in the said chaser.

2. Adjustable holding means for circular chasers and the like including in combination: a carrier-member having a ring-shaped recess therein; a ring-like adjusting-member having an axial bore and rotatably mounted in the said recess in the said carrier-member and carrying means for interlocking engagement with a chaser or the like, which means projects beyond the adjacent face of the said carrier-member for fitting within a bore in a chaser; a rigid stud projecting outwardly from the center of the ring-shaped recess in the said carrier-member through the axial bore in the said adjusting-member and forming a rigid and permanent feature of the said carrier-member; and means associated with the said carrier-member for turning the said adjusting-member in the said recess of the said carrier-member.

3. Adjustable holding means for circular chasers and the like including in combination: a carrier-member having a ring-shaped recess therein; a ring-like adjusting-member having an axial bore and rotatably mounted in the said recess in the said carrier-member and carrying means for interlocking engagement with a chaser or the like, which means projects beyond the adjacent face of the said carrier-member for entry into a bore in a chaser; a rigid stud projecting outwardly from and forming a permanent unitary feature of the said carrier-member through the axial bore in the said adjusting-member beyond the forward face thereof; and means associated with the said carrier-member for turning the said adjusting-member in the said recess of the said carrier-member.

4. Adjustable holding means for circular chasers and the like including in combination: a carrier-member having a ring-shaped recess therein; a ring-like adjusting-member having an axial bore and a cylindrical peripheral portion fitting within and bearing in the said recess in the said carrier-member so as to be laterally supported thereby and having also a locking-means-carrying portion extending beyond the adjacent face of the said carrier-member for entry into the bore of a chaser or the like; means associated with the said chaser-carrier member for turning the said adjusting-member in the said recess of the said carrier-member; and a supporting-stud forming a permanent rigid feature of the said carrier-member and extending axially through the said adjusting-member and outwardly beyond the forwardly-projecting locking-means-carrying portion of the said adjusting-member.

5. Adjustable holding means for circular chasers and the like including in combination: a carrier-member having a cylindrical recess therein; a ring-like adjusting-member having an axial bore and a cylindrical peripheral portion fitting within and bearing in the said recess in the said carrier-member so as to be laterally supported thereby and having also a peripherally-serrated portion extending beyond the adjacent face of the said carrier-member for entry into, and interlocking engagement with, a chaser-bore; means associated with the said chaser-carrier for turning the said adjusting-member in the said recess of the said carrier-member; and a supporting-stud extending axially through the said ring-like adjusting-member and axially with respect to the recess in the said carrier-member and serving to secure a chaser directly to the said carrier-member and to retain the said adjusting-member in the recess in the said carrier-member.

ROYCE M. STRICKLAND.
ALBERT F. BREITENSTEIN.